US010003847B2

(12) United States Patent
Lewis et al.

(10) Patent No.: US 10,003,847 B2
(45) Date of Patent: Jun. 19, 2018

(54) WATCH-TIME CLUSTERING FOR IMPROVING VIDEO SEARCHES, SELECTION AND PROVISION

(71) Applicant: Google LLC, Mountain View, CA (US)

(72) Inventors: Justin Lewis, Marina del Rey, FL (US); Robert Alexander Durbin, Marina del Rey, FL (US)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 15/136,558

(22) Filed: Apr. 22, 2016

(65) Prior Publication Data

US 2017/0311035 A1    Oct. 26, 2017

(51) Int. Cl.
| | |
|---|---|
| *H04N 21/442* | (2011.01) |
| *H04N 21/258* | (2011.01) |
| *H04N 21/84* | (2011.01) |
| *G06F 17/30* | (2006.01) |
| *H04N 21/482* | (2011.01) |
| *H04N 21/466* | (2011.01) |
| *H04N 21/45* | (2011.01) |
| *H04N 21/25* | (2011.01) |

(52) U.S. Cl.
CPC ... *H04N 21/44204* (2013.01); *G06F 17/3053* (2013.01); *G06F 17/30823* (2013.01); *G06F 17/30858* (2013.01); *H04N 21/252* (2013.01); *H04N 21/25883* (2013.01); *H04N 21/25891* (2013.01); *H04N 21/4532* (2013.01); *H04N 21/4665* (2013.01); *H04N 21/4826* (2013.01); *H04N 21/4828* (2013.01); *H04N 21/84* (2013.01)

(58) Field of Classification Search
None
See application file for complete search history.

(56) References Cited

U.S. PATENT DOCUMENTS

| | | | |
|---|---|---|---|
| 7,240,355 B1 * | 7/2007 | Eldering | H04N 21/2353 348/E5.002 |
| 9,098,511 B1 | 8/2015 | Lawry et al. | |

(Continued)

OTHER PUBLICATIONS

International Search Report and Written Opinion in International Application No. PCT/US2016/048842, dated Jan. 19, 2017, 10 pages.

*Primary Examiner* — Hoang Vu A Nguyen Ba
(74) *Attorney, Agent, or Firm* — Fish & Richardson P.C.

(57) ABSTRACT

This document describes, among other things, systems, methods, devices, and other techniques for using information about how long various videos were presented at client devices to determine subsequent video recommendations and search results. In some implementations, a computing can include a modeling apparatus, a front-end server, a request manager, one or more video file storage devices, a video selector, or a combination of some or all of these. The video selector can select video content for a particular digitized video among a plurality of digitized videos to serve to a computing device responsive to a request. The selection can be based at least in part on how long the particular digitized video has been presented at client devices associated with users having characteristics that match one or more characteristics of the user that submitted the request for video content, as indicated by the modeling apparatus.

23 Claims, 7 Drawing Sheets

(56) References Cited

U.S. PATENT DOCUMENTS

| | | |
|---|---|---|
| 2007/0100824 A1 | 5/2007 | Richardson et al. |
| 2016/0029057 A1* | 1/2016 | Wickenkamp ....... H04N 21/252 725/14 |
| 2016/0050447 A1* | 2/2016 | Nicholas ............ H04N 7/17318 725/14 |

* cited by examiner

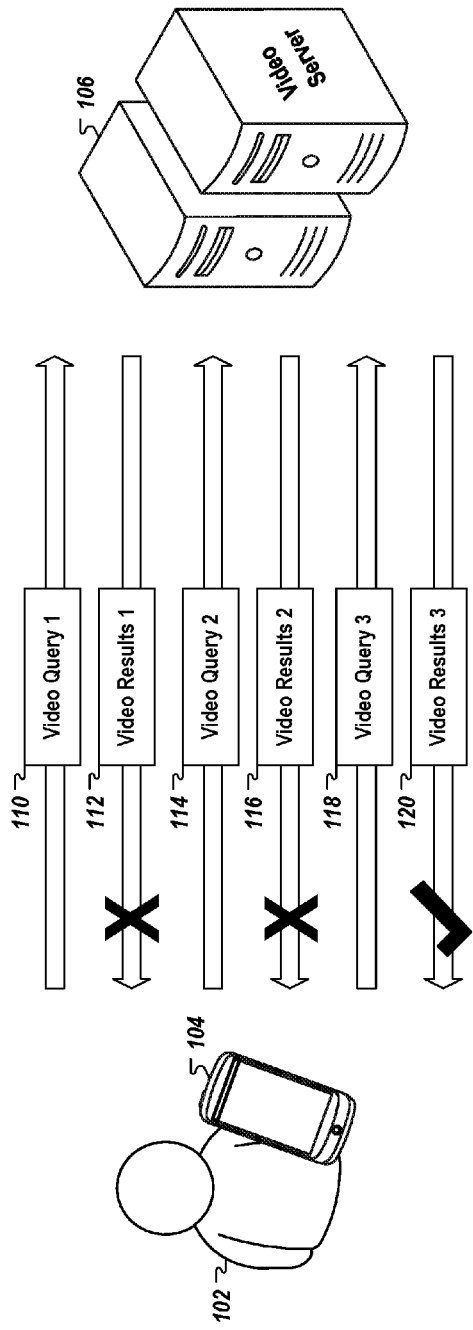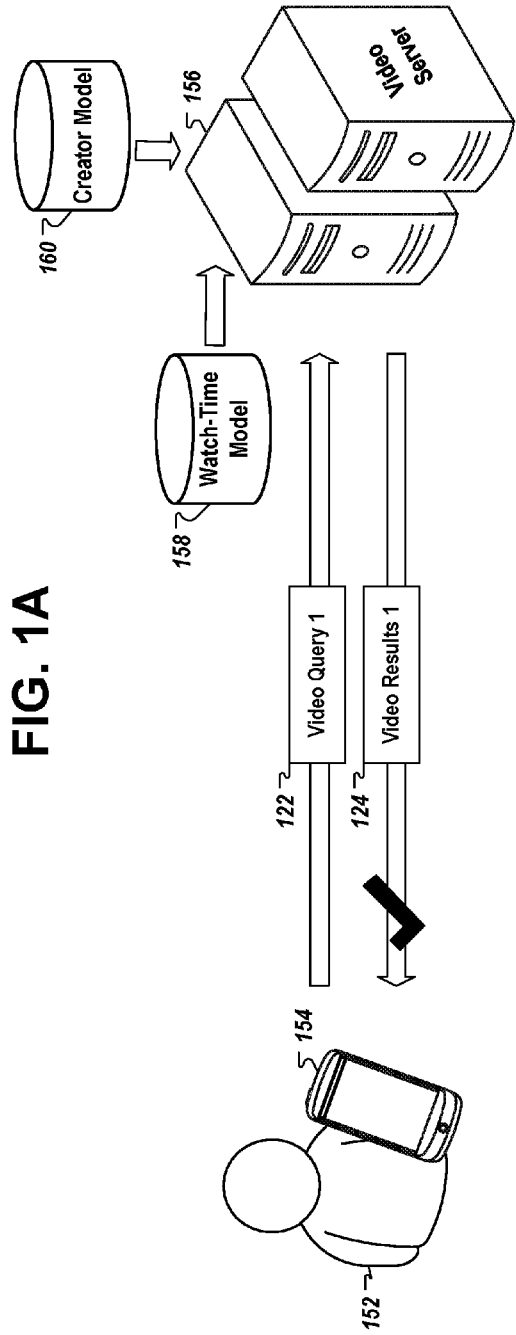

WATCH-TIME CLUSTERING FOR IMPROVING VIDEO SEARCHES, SELECTION AND PROVISION

TECHNICAL FIELD

The subject matter of this document generally relates to computer-implemented techniques for searching digitized video content and determining video content to serve over a communications network.

BACKGROUND

Video-sharing services provide a platform for video content creators to distribute digitized videos to other parties over a network, such as the Internet. The video-sharing service may be implemented by a computing system comprising one or more servers in one or more locations. Content creators can upload their videos to the computing system, along with metadata that describes their videos, which the computing system uses to index the videos and make them discoverable to users who express an interest in viewing such videos. The video-sharing service can then receive search queries from users requesting video content. In some instances, the video-sharing service selects videos to serve to users based on a comparison of topics associated with the videos to topics indicated in search queries that the users have submitted to the video-sharing service.

SUMMARY

This document generally describes in some aspects systems, methods, devices, and other techniques for using information about how long various categories of users have watched online videos to improve video search results and recommendations. When a requesting user is provided with a set of video search results that does not include videos that the requesting user was expecting to receive for a particular query, the user may revise the query in an iterative manner until more suitable videos are identified for the requesting user. Sometimes, even if the results do include one or more videos that the user expected to receive, they may not be among the top results that are displayed to a user. This can result in an unnecessary usage of valuable network resources, i.e. use of processing resources in servers, client or routers, bandwidth on communication links etc., simply for processing multiple search requests submitted by the requesting user. Such searching techniques are considered inefficient and are a drain on valuable processing and network resources. The present embodiments aim to overcome these inefficiencies. The embodiments described herein propose making use of one or more measured and/or stored attributes and characteristics concerning the users or the user devices that are requesting the videos, or that have requested the videos in the past to provide a set of search results to the requesting user. For example, a video search system may use watch-time information as a heuristic for ranking and selecting video content to serve to users. In some implementations, the video search system may further score video content creators based on how long their videos have been watched by various categories of users, and the creators' scores can be used as a heuristic for ranking and selecting video content to serve to users.

In some implementations, the subject matter described herein can include a computing system for serving videos over a network. The system computing can include a modeling apparatus, a front-end server, a request manager, one or more video file storage devices, a video selector, or a combination of some or all of these. The modeling apparatus (i) obtains, for various digitized videos that the computing system has presented at client devices over a network, watch time information that specifies an amount of time that the various digitized videos were presented at the client devices, (ii) groups the watch time information into different groups based on characteristics of users associated with the client devices, and (iii) determines, based on the grouping of watch time information, how long the various digitized videos were presented to different groups of users. The front-end server receives a request for video content and serves video content identified in response to the request over the network to a computing device that is separate from the computing system. The request manager, including one or more processors, analyzes the request for video content and identifies selection criteria in the request, including identifying one or more characteristics of a user that submitted the request for video content. The one or more video file storage devices store a plurality of digitized videos that have been made available by various parties for distribution over the network. The video selector, including one or more processors, selects, from the video file storage devices, video content for a particular digitized video among the plurality of digitized videos to serve to the computing device in response to the request, wherein the selection is based at least in part on how long the particular digitized video has been presented at client devices associated with users having characteristics that match the one or more characteristics of the user that submitted the request for video content, as indicated by the modeling apparatus.

These and other implementations can optionally include one or more of the following features.

The modeling apparatus can group the watch time information into different groups by assigning respective portions of the watch time information to different viewer categories that correspond to different sets of characteristics of the users associated with the client devices at which the various digitized videos were presented. The modeling apparatus can further identify, for each respective viewer category, a distribution of watch time of users in the respective viewer category among digitized videos in a group of digitized videos that were at least partially presented at computing devices associated with users in the respective category.

For each respective digitized video among the plurality of digitized videos stored on the one or more video file storage devices, the modeling apparatus can: identify, from the watch time information and for each respective viewer category among a plurality of viewer categories, how long the respective digitized video was presented at client devices associated with users in the respective viewer category; and assign to the respective digitized video, for each respective viewer category among the plurality of viewer categories and based on how long the respective digitized video was presented at client devices associated with users in the respective viewer category, a score that indicates a relevance of the respective digitized video to the respective viewer category.

The video content for the particular digitized video selected by the video selector can include at least one of the particular digitized video, a title of the particular digitized video, a description of the particular digitized video, or a hyperlink to the particular digitized video.

The one or more characteristics of the user that submitted the request for video content can include at least one of demographic characteristics of the user or behavioral characteristics of the user.

The one or more characteristics of the user that submitted the request for video content can include demographic characteristics that indicate at least an age or gender of the user.

The one or more characteristics of the user that submitted the request for video content can include behavioral characteristics that indicate one or more queries submitted by the user in a same session in which the user submitted the request for video content. The video selector can select to serve video content for the particular digitized video among the plurality of digitized videos based at least on how long the particular digitized video was presented at client devices associated with other users during sessions in which the other users also submitted the one or more queries or at least one query determined to be similar to the one or more queries.

The one or more characteristics of the user that submitted the request for video content can include behavioral characteristics that indicate a navigation history of the user associated with the request for video content. The video selector selects to serve video content for the particular digitized video among the plurality of digitized videos based at least on how long the particular digitized video was presented at client devices associated with other users having a same or similar navigation history as the user that submitted the request, in browsing sessions that led the other users to watch the particular digitized video.

The video selector is further configured to select video content to serve to various computing devices as recommendations to respective users of the various computing devices.

In response to receiving the request for video content, the request manager can be configured to identify one or more topics of the requested video content, including identifying the topics from at least one of a user-entered query that is a part of the request or identifying the topics from information associated with the user that is not included in the request. The video selector can be configured to select video content to serve to the computing device by: identifying digitized videos that are determined to be relevant to the one or more topics; ranking the identified digitized videos based at least on how long each of the identified digitized videos has been presented at client devices associated with users having characteristics that match the one or more characteristics of the user that submitted the request for video content; and based on the ranking, selecting video content for one or more top-ranked digitized videos to serve to the computing device, including the video content for the particular digitized video.

The system can further include an instrumentation manager, including one or more processors, that generates and embeds computer code in various web pages that the computing system serves to various client devices for the presentation of various digitized videos, wherein the computer code is configured, when executed on the various client devices, to cause the various computing devices to periodically report over the network and to the computing system amounts of time that the various digitized videos were presented at the various client devices.

Some implementations of the subject matter described herein can include a computer-implemented method. The method can include obtaining at a computing system data that indicates, for each respective computing device among a plurality of computing devices to which at least a portion of a first video hosted by the computing system was served, a respective watch time for the first video that occurred at the respective computing device; for each of the respective watch times, correlating the respective watch time with one or more viewer categories among a plurality of viewer categories based on one or more characteristics of a user of the respective computing device at which the respective watch time occurred; for each respective viewer category among the plurality of viewer categories, accumulating the respective watch times that are correlated with the respective viewer category to generate an accumulated watch time for the respective viewer category; and after the correlating, determining whether to provide video content associated with the first video to a first user based at least on the accumulated watch time of the first video for a viewer category that matches the first user.

These and other implementations can optionally include one or more of the following features.

Determining whether to provide video content associated with the first video to the first user can include determining whether the accumulated watch time of the first video for the viewer category that matches the first user meets a threshold watch time.

Determining whether to provide video content associated with the first video to the first user can include: ranking a plurality of candidate videos, including the first video, based at least on respective accumulated watch times of the plurality of candidate videos for the viewer category that matches the first user; and selecting video content associated with one or more videos of the plurality of candidate videos based on the ranking.

The plurality of viewer categories can classify viewers based on at least one of demographic characteristics of viewers and online behavioral characteristics of viewers.

For each respective viewer category among the plurality of viewer categories, a respective quality score can be assigned to the respective viewer category;

A first watch time of the first video by a user in a first viewer category among the plurality of viewer categories can be identified; in response to identifying the first watch time, a performance score of a creator of the first video can be increased by an amount that is based on the first watch time and the respective quality score assigned to the first viewer category; a second watch time of the first video by a user in a second viewer category among the plurality of viewer categories can be identified;

In response to identifying the second watch time, the performance score of the creator of the first video can be increased by an amount that is based on the second watch time and the respective quality score assigned to the second viewer category.

The method can include determining the respective quality scores assigned to respective viewer categories based on revenue generated as a result of viewers in the respective viewer categories watching videos hosted by the computing system.

Some implementations of the subject matter described herein can include one or more non-transitory computer-readable media having instructions stored thereon that, when executed by one or more processors, cause performance of operations. The operations can include obtaining at a computing system data that indicates, for each respective computing device among a plurality of computing devices to which at least a portion of a first video hosted by the computing system was served, a respective watch time for the first video that occurred at the respective computing device; for each of the respective watch times, correlating the respective watch time with one or more viewer categories among a plurality of viewer categories based on one or more characteristics of a user of the respective computing device at which the respective watch time occurred; for each respective viewer category among the plurality of viewer categories, accumulating the respective watch times that are correlated with the respective viewer category to generate an accumulated watch time for the respective viewer category; and after the correlating, determining whether to provide video content associated with the first video to a first user based at least on the accumulated watch time of the first video for a viewer category that matches the first user.

Some implementations of the subject matter described herein can include a computing system for serving videos over a network. The computing system can include: a modeling apparatus that obtains watch time information for various digitized videos that the computing system has presented over a network, the apparatus including a first processor for measuring one or more attributes associated with one or more users of the system, including measuring watch time information of one or more videos by a respective user (e.g., measuring how long the one or more videos were presented at a computing device associated with the respective user); the modelling apparatus further configured to group the measured watch time information into different groups based on stored or measured characteristics of users that watched the various videos, and to determine, based on the grouping, how long different groups of users have viewed the various videos; a front-end server that receives a request for video content and serves video content identified in response to the request over the network to a computing device that is separate from the computing system; a request manager, including one or more processors, that analyzes the request for video content and identifies selection criteria in the request, including identifying one or more characteristics of a user that submitted the request for video content; one or more video file storage devices that store a plurality of digitized videos that have been made available by various parties for distribution over the network; and a video selector, including one or more processors, that selects, from the video file storage devices, video content for a particular digitized video among the plurality of digitized videos to serve to the computing device in response to the request, wherein the selection is based at least in part on how long the particular digitized video has been viewed by users having characteristics that match the one or more characteristics of the user that submitted the request for video content, as indicated by the modeling apparatus.

In some implementations, the techniques described herein may realize, in certain instances, one or more of the following advantages. Generally, the watch-time and creator performance heuristics may allow the video search system to better identify videos that users are interested in viewing. Similarly, the video search system may reduce occurrences of serving videos to users' computing devices that are not sufficiently relevant to users' search queries, or which the users are otherwise not particularly interested in viewing. As a result of making better video selections for users, the search system may conserve server resources that would otherwise be wasted in serving videos to users that the users are not interested in watching. Similarly, these techniques may conserve network bandwidth by reducing the amount of video traffic related to poor video selections, and may conserve power on users' devices by reducing playback time of videos that users are not actually interested in viewing. In some implementations, the creator performance scores can incentivize creators to generate quality video content that is targeted toward certain categories of viewers whose interactions with the video-sharing service disproportionately enhance the value of the service.

DESCRIPTION OF DRAWINGS

FIGS. 1A and 1B illustrate conceptual diagrams of various users interacting with a video search system to request online video content. In FIG. 1B, the video search system uses watch-time and creator performance heuristics to improve the selection of video content for users.

Like references among the various drawings indicate like elements.

DETAILED DESCRIPTION

Figure 2:
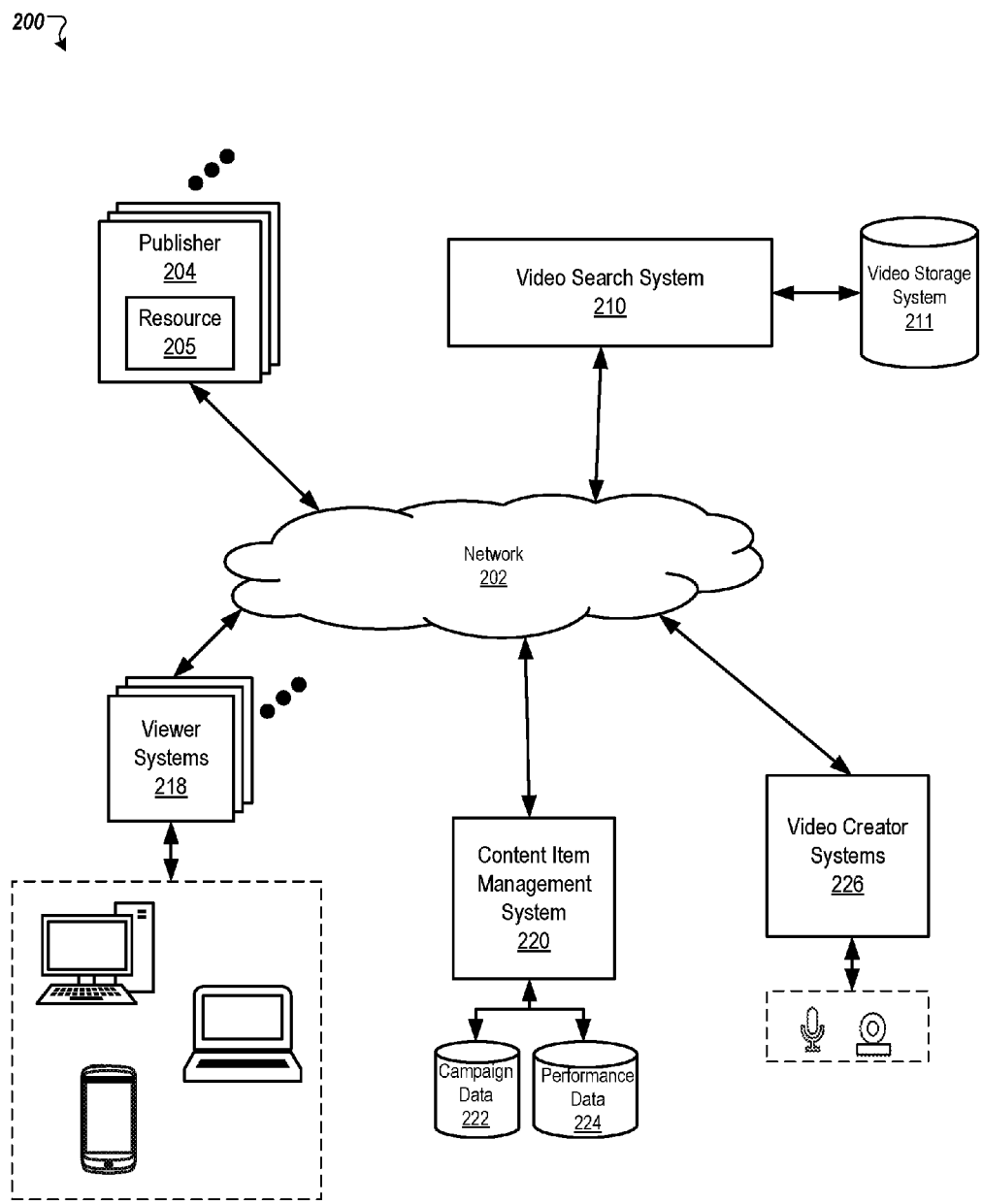
FIG. 2 depicts a block diagram of an example environment in which video content can be captured, analyzed, and shared between computer systems.

Some techniques for providing video sharing services that may provide results based on query information experience drawbacks as explained above, resulting in a strain on useful network and processing resources. The described embodiments herein propose a method of clustering and categorizing video data based on one or more attributes that are related to actions that have been performed by one or more users of the system or related to characteristics pertaining to said users that are stored on the system. User(s) actions may be past or real-time events or occurrences, such as data obtained relating to past searches, previous selections, responses to one or more similar videos, etc. Characteristics such as stored details of user preferences and personal information may also be used. This document generally describes in some aspects systems, methods, devices, and other techniques for using information about how long various categories of users have watched online videos to improve video search results and recommendations.

In some examples, a computing system may implement an online video-sharing service that hosts videos submitted by a collection of independent creators and makes the creators' videos available for distribution over a network (e.g., the Internet) to one or more viewers. Viewers may access the video-sharing service on respective client devices and search videos that that are hosted on the service. The system may also present to viewers recommendations likely to be of interest to the viewers.

According to the techniques described herein, historical video watch-time data may be used as a heuristic for determining video search results and recommendations to present to users. For example, the computing system may identify demographic or behavioral characteristics associated with a particular viewer that has submitted a video search request. Based on the viewer's characteristics, the system may classify the viewer into one or more viewer categories and determine videos that have accumulated high watch times from other viewers within the same or related categories. Videos with higher watch times within these categories may then be promoted, for example, in search results that the system returns in response to the viewer's query. In some implementations, the techniques described herein may additionally or alternatively be applied to score and rank creators that are associated with the service based on watch-time metrics for their respective videos in different viewer categories. The system can then use the creators' scores or rankings as a further heuristic for determining video search results and recommendations and for distributing assets among the creators.

Turning to FIGS. 1A and 1B, conceptual diagrams are shown of users interacting with a video search system to request online video content. These diagrams show that, in some implementations, a video search system can improve selection of video content to serve to a user based on watch-time heuristics, creator performance heuristics, or both, so as to more efficiently provide to a user video content that the user is likely to be interested in. By initially serving more relevant video content to a user, the techniques discussed herein may make better use of system resources because the user need not make as many queries or selections to play different videos before arriving at a satisfactory video. As such, the servers of the video search system may use less computational resources and reduce the expense in identifying and transmitting unsatisfactory video content to the user. Moreover, the bandwidth of a communications network (e.g., a local area network, wide area network, wireless network, and/or the Internet) that connects the user's device to the servers of the video search system may be conserved by reducing the amount of data for unsatisfactory video content that the network carries to user devices. In some cases, this can be especially significant for wireless and cellular data networks in which the amount of bandwidth consumed by individual users is closely regulated so as to ensure that, on average, the capacity of the network is not overwhelmed by the activities of a population of users. Streaming video and other video content requires a relatively large amount of bandwidth (e.g., as compared to text, still images, or some other content types), and so reducing the amount of unnecessary video content transmitted on the network can have a significant impact on network performance.

In some implementations, the techniques described herein for using watch-time heuristics, creator performance heuristics, or a combination thereof, to better target video content to users can also improve aspects of users' computing devices. Downloading, streaming, and playing video on users' devices are generally computationally expensive activities. Some of this expense may be reduced by the presently described embodiments as the embodiments propose downloading, streaming, and/or playing video content that are identified as ones that the users are interested in viewing. Moreover, in the context of mobile devices and other battery-powered computing devices, saving computational expense from activities related to obtaining and processing unsatisfactory video content can conserve power and reduce battery drain on the device, thereby extending the device's battery life. Users of mobile devices may also benefit from arriving at desired content more efficiently in that the amount of data expended on unsatisfactory video content from a limited data plan associated with a user's account on a mobile carrier network may be reduced, for example.

In FIG. 1A, a user 102 is shown using a mobile computing device 104 to submit video search queries to a video server 106. The mobile computing device 104 may be a smartphone, a tablet computing device, a netbook, a notebook computer, or a wearable device, for example. Although not shown, the user may alternatively submit queries from other types of computers as well such as a desktop computer, a television device that is enabled to stream online video content, or the like. In the example of FIG. 1A, the user 102 submits the search queries to a video server 106 of a search system that provides a video-sharing service, but that is not enabled to use watch-time heuristics or creator performance heuristics (as determined based at least in part on watch-time data) in selecting video content to serve to the computing device 104 in response to the search requests. The video servers 106 may generally comprise a collection of one or more computers and may perform processing across the one or more computers in one or more geographically separated locations.

From the time the user 102 initiates a video search session in the example of FIG. 1A, the user 102 submits queries for three search requests before eventually obtaining satisfactory video content. The respective search requests and responses are represented as stages 110-120 in FIG. 1A. Thus, at stage 110, the user 102 submits via his or her mobile device 104 a query for a first search request 110 to the video server 106. At stage 112, the video server 106 provides content for one or more videos to the user 102 responsive to the first search request. The user 102 may review the initial video content provided by the server 106 and determine that he or she is generally not interested in those videos (i.e., the videos are unsatisfactory). In some implementations, the video server 106 may return, as a response to a search request, lists of multiple search results that respectively identify different ones of a plurality of videos that the video server 106 has determined to be relevant to the request. The user 102 may select search results from the list to cause the mobile device 104 to begin streaming and playing a particular video that is referenced by the selected search result.

In some instances, the user 102 may "surf" through search results until finding satisfactory content by selecting one search result after another and watching only short clips of the corresponding videos until the user 102 has seen enough to decide whether he or she wishes to watch an extended amount of the video (e.g., because the video is satisfactory and pertains to subject matter the user was interested in viewing) or wishes to find another video. In some cases, if the user 102 does not find a satisfactory video in response to a first query, the user may refine the query and submit an updated search. The process of surfing through a new list of video results may be repeated, and an updated search is performed if no satisfactory video is identified. Thus, at stage 114, the user 102 submits a second video query, and receives a second response at stage 116. Not until the user 102 submits a search request with a third query, at stage 118, does the video server 106 respond with results that identify one or more videos that the user 102 finds satisfactory (as indicated by the checkmark by stage 120). Each new search request submitted and selected search result that leads to watching a video consumes CPU cycles at the video server 106, consumes network bandwidth, and contributes to battery drain on the mobile device 104 because the user watches portions of videos that are not what the user 102 ultimately intended to view.

Unlike the scenario in FIG. 1A, the scenario represented in FIG. 1B provides a video server 156 of a computing system that is enabled to use at least one of a watch-time model 158 and a creator model 160 as heuristics to determine video content to present to a specific user 152 (e.g., in response to a search request or as a recommendation). Generally, in this scenario, the user 152 uses his or her mobile device 154 to submit a video query to the video server 156 (stage 122), and the video server 156 provides one or more video results as a response to the search request (stage 124). In this instance, the initial video results that the server 156 sends to the mobile device 154 are improved relative to the initial results that the server 106 provided in the scenario of FIG. 1A. For example, the user 152 may even find satisfactory video content, or a particular video that he or she desired to locate, in the server's 156 response to the first query of the video search session. Generally, the server 106 is able to identify more relevant videos for the user 152 as a result of using the watch-time and/or creators' performance heuristics. Therefore, the user 152 need not surf through as many video clips or submit as many refined queries to locate satisfactory content. Accordingly, the user's 152 video search session in FIG. 1B places less computational strain on the video server 156, uses less network resources/bandwidth, and reduces unnecessary CPU cycles and battery drain at the mobile device 154.

Notably, the scenarios depicted in FIGS. 1A and 1B represent advantages that may be achieved generally through the use of watch-time and creators' performance heuristics at a video server system. Users may not always be served satisfactory content in response to an initial search, however, but in the aggregate experience across many users and over time, these heuristics can in some implementations described herein facilitate better, earlier identification of relevant video content to serve to users. This in turn can result in numerous advantages as have been described.

FIG. 2 depicts a block diagram of an example environment 200 in which video watch-time data can be captured, analyzed, and shared between computer systems. A data communication network 202 enables data communication between multiple electronic devices and systems. In this environment 200, users can access video content, provide video content, exchange information, and search for videos over the network 202. The network 202 can include, for example, a local area network (LAN), a cellular phone and data network, a wide area network (WAN), e.g., the Internet, or a combination of them. The links on the network can be wireline or wireless links or both. Video content creators can also generate and create videos to share over the network 200 using video creator systems 226.

In some implementations, the environment 200 includes a video search system 210. In operation, the video search system 210 can implement a video-sharing service that enables various parties (creators) to make digitized videos available for online distribution to other parties (viewers). The video-sharing service may be accessed from a website or applications associated with one or more domains. For example, parties may upload original video content to the video search system 210, and the video search system 210 can store and index the videos in the video storage system 211. Viewers at viewer systems 218 may then query the video search system 210 to request video content according to one or more preferences of the viewers. In some implementations, the video search system 210 is configured to provide video content to users based on indications of how long various videos have been viewed over a period of time by groups of similarly situated users. The details of the video search system 210 and video storage system 211 are described further herein with respect to FIG. 3.

Generally, each viewer can access videos through a viewer system 218 associated with the respective viewer. A given viewer system 218 can include an electronic device, or collection of devices, that are capable of requesting, receiving, and playing videos over the network 202. Example viewer systems 218 may include one or more of a smartphone, a tablet computing device, a notebook computer, a desktop computers, a smart television device, a wearable computing device, a virtual reality device, an augmented reality device, or a combination of two or more of these. The viewer system 218 may include a user application, e.g., a web browser or a native media player application that sends and receives data over the network 202, generally in response to user actions. The web browser can enable a user to display and interact with text, images, videos, music and other information typically located on a web page at a website on the Internet or a local area network. The media player application may play digitized videos downloaded or streamed from the video search system 210, and may generate watch-time reports that are transmitted back to the video search system 210 to identify how viewers watched served videos on the viewer systems 218.

In some implementations, the environment 200 can include a publisher website 204 includes one or more resources 205 associated with a domain and hosted by one or more servers in one or more locations. Generally, a website is a collection of web pages formatted in hypertext markup language (HTML) that can contain text, images, multimedia content (e.g., videos), and programming elements, for example, scripts. Each website 204 is maintained by a content publisher, which is an entity that controls, manages and/or owns the website 204. The publisher websites 204 can provide a variety of different web pages, such as web pages that present videos hosted by the video-sharing service at video search system 210.

A resource 205 in this context can include any data that is provided by a publisher website 204 over the network 202 and that has a resource address, e.g., a uniform resource locator (URL). Resources may be HTML pages, electronic documents, images files, video files, audio files, and feed sources, to name just a few. The resources may include embedded information, e.g., meta information and hyperlinks, and/or embedded instructions, e.g., client-side scripts.

In some implementations, the environment 200 can include a content item management system 220, which generally provides supplemental content items (e.g., advertisements) for presentation with videos that the video search system 210 serves to viewer systems 218. In some implementations, the content item management system 220 allows supplemental content providers to define selection rules that take into account characteristics of a particular video viewer to provide relevant supplemental content to the viewer. Example selection rules include keyword selection, in which the supplemental content providers provide bids for keywords that are present in either search queries, videos, or video content metadata. Supplemental content items that are associated with keywords having bids that result in a supplemental item slot being awarded in response to an auction can be selected for display in supplemental content slots associated with video content. For example, supplemental content may be presented in a banner format near a video playing on a viewer's device or over a portion of the video playing on the viewer's device. In some implementations, the system may cause supplemental content in the form of a video clip to be presented to a viewer as a lead-in before a requested video is played for a viewer. When a viewer selects a supplemental content item, the viewer's device can generate a request for a landing page associated with the selected content.

The supplemental content item management system 220 can include a data storage system that stores campaign data 222 and performance data 224. The campaign data 222 can store, for example, supplemental content items, selection information, and budgeting information for supplemental content providers. The performance data 224 can store data indicating the performance of the supplemental content items that are served. Such performance data can include, for example, click-through rates for supplemental content items, the number of impressions for supplemental content items, and the number of conversions for supplemental content items.

In some implementations, the campaign data 222 and the performance data 224 can be used as input to a supplemental content item selection procedure. In particular, the content item management system 220, in response to each request for supplemental content, conducts a selection procedure to select items that are provided in response to the request. The system 220 can rank supplemental content items according to a score that, in some implementations, is proportional to a value based on a supplemental content item bid and one or more parameters specified in the performance data 224. The highest ranked supplemental content items resulting from the auction can be selected and provided to the requesting user device.

Figure 3:
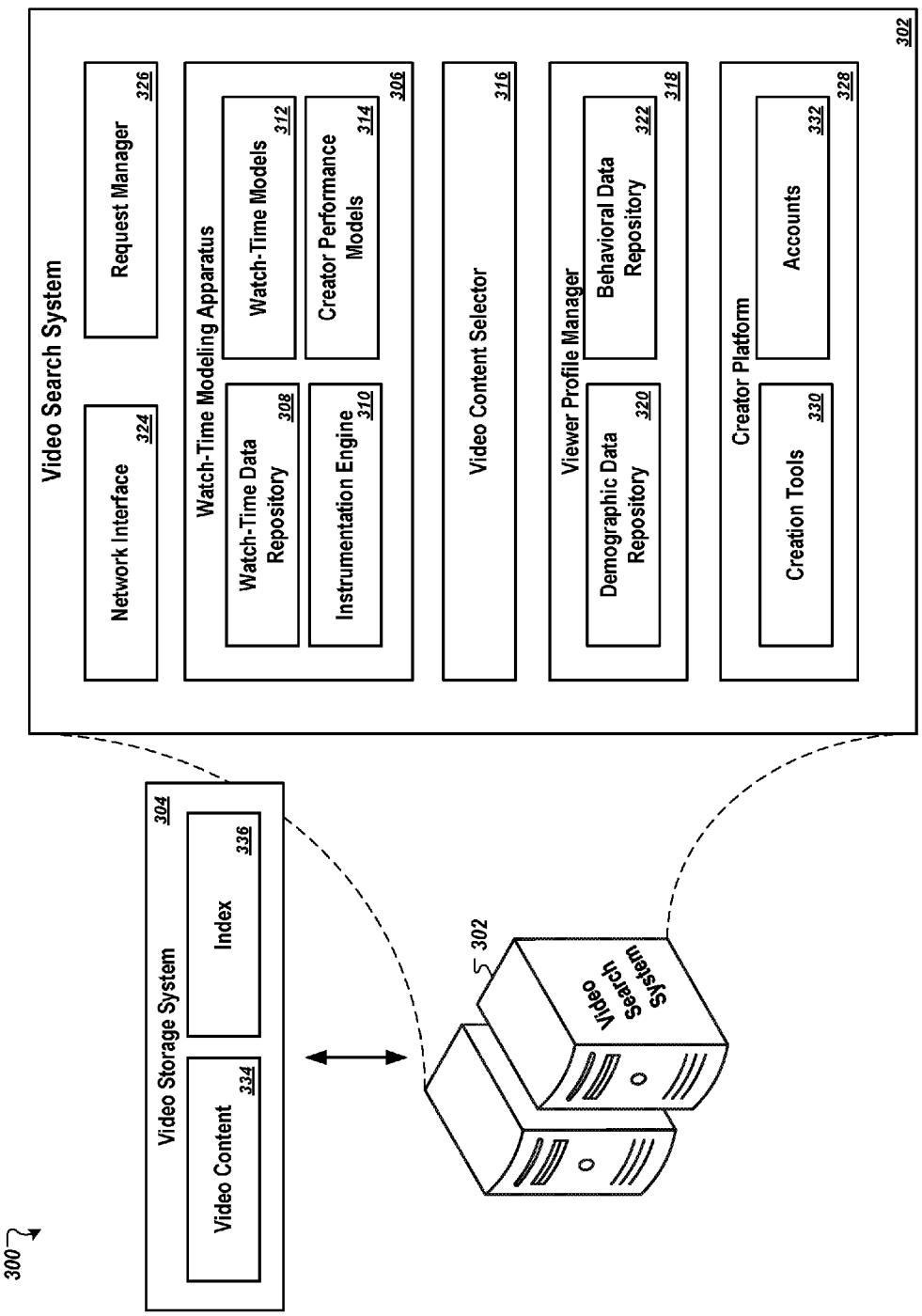
FIG. 3 shows a block diagram of an example computing system, including a video search system and a video storage system that use video watch-time information to determine video content to serve to various computing devices of viewers in communication with the computing system.

Turning to FIG. 3, a block diagram is shown of an example computing system 300, including a video search system 302 and a video storage system 304, which uses video watch-time information to determine video content to serve to computing devices of various viewers in communication with the computing system 300. In some implementations, the video search system 210 of FIG. 2 may be implemented as the video search system 302 of FIG. 3. In some implementations, the video storage system 211 may be implemented as the video storage system 304 of FIG. 3. In some implementations, the computing system 300 may further be configured to carry out the processes 400, 500, and/or 600, which are represented by the flowcharts in FIGS. 4, 5, and 6, respectively. Each of the video search system 302 and the video search system 304 may be implemented on one or more computers in one or more locations. The computers of the systems 302 and 304 may be implemented by a combination of software and hardware as depicted and described with respect to FIG. 7.

In some implementations, the video search system 302 provides an online video-sharing service in which various parties can upload digitized videos to the service to make the videos available for distribution to one or more other parties. For the purpose of this document, the parties that submit (e.g., upload) videos for distribution through the service are referred to as creators, and the parties that watch videos through the service are referred to as viewers. In many cases, "creators" may include parties that organically created their own videos to share with others, but "creators" may also refer to parties who upload content that was actually created by one or more other parties but which the first party wishes to share on the service. The video search system 302 may include a creator platform 328 that provides an interface for creators to submit and monitor the performance of their videos on the sharing service. Creators may register with accounts 332 with the service and may use various tools 330 to facilitate video content creation and distribution.

In some implementations, the video search system 302 may enforce policies and technological restrictions to prevent parties from distributing content through the video-sharing service without proper authorization from the original creator of the content. The video search system 302 is generally operable to select video content to provide as recommendations to users or as responses to search queries submitted by users, based at least in part on watch-time information that indicates how long users in different viewer categories have viewed different videos. In some implementations, viewers can stream digitized videos hosted by the computing system 300. In some implementations, viewers can download all or portions of digitized videos hosted by the computing system 300 to allow the viewers to watch the videos offline at later times, for example.

The video storage system 304 is generally responsible for storing, maintaining, and indexing video content for videos that have been made available for distribution on the video-sharing service. The video storage system 304 can include a video content repository 34 and an index 336. The video content repository 304 includes one or more processors and one or more storage devices in one or more locations that store video content for a large number of digitized videos. For example, when a creator uploads a video to the video search system 302 for sharing, the video file can be provided to the video storage system 304, processed (e.g., compressed and made to conform to one or more standard resolutions), stored, and indexed for searching. Generally, video content may include the actual digitized video itself as well as pertinent metadata about the digitized video. For example, the video content repository 334 may identify a title, a short textual description, and a creator ID for a given video, and correlate the metadata with the digitized video file in the video storage system 304. The index 336 includes information that makes the video content searchable, such as references to the identified metadata for various videos, hash tables, or the like. The video storage system 304 and the video search system 302 can pass messages between each other to identify and provide video content that is to be served to computing devices separate from the system 300 (e.g., over the Internet).

In some implementations, the video search system 300 can include a watch-time modeling apparatus 306, a video content selector 316, a viewer profile manager 318, a network interface (front-end server) 324, a request manager 326, a creator platform 328, or a combination of all or some of these components. Each of the components may generally be implemented as a combination of hardware and software of one or more computers in one or more locations, such as computers described with respect to FIG. 7.

The network interface 324 is generally configured to enable network communications for the video search system 302. The network interface 324 can receive from creators' computing devices requests to make digitized video content available for distribution on the sharing service provided by the search system 302. The network interface 324 can also receive from viewers' computing devices requests to provide shared video content for presentations to the viewers and can serve video content to the viewers' computing devices responsive to their requests.

The request manager 326 is generally configured to process requests received from computing devices remote from the video search system 302, as indicated by the network interface 324. For requests for video content from viewers' computing devices, the request manager 326 can analyze the request to identify one or more selection criteria for video content that is to be served to the viewers' computing devices responsive to the requests. The selection criteria may be expressly indicated in the content of a given request and/or the selection criteria may be identified from data sources external to the request, based on information associated with the request. As an example, some requests may expressly include a search query that identifies one or more terms entered and submitted by a viewer, where the terms indicate topics of video content that the user has targeted for a search.

Some requests, however, may not include a search query or otherwise may not expressly identify topics of video content that has been requested. The request manager 326 may nevertheless identify topics or other selection criteria for the request based on circumstantial data or metadata associated with the request, such as an identity of the user to whom the video content is to be presented, a timestamp assigned to the request indicating a time that the request was submitted, or location information that indicates a location of the user to whom the requested video content is to be submitted. For example, the request manager 326 can identify the targeted viewer based on analysis of the request, and then one or more characteristics of the user can be identified from the viewer profile manager 218 and used by the video content selector 316 as selection criteria for determining video content to serve in a response to the request. A video content request may not include a query, for example, when the video search system 302 is requested to provide a recommendation for video content to a user, such as when the user first accesses a homepage of the video-sharing service and before the user has entered a query, so that the user is automatically presented with options for viewing digitized videos of potential interest to the user merely by virtue of having visited the homepage.

The watch-time modeling apparatus 306 is generally configured to determine models for scoring videos, creators, or both based on watch-time data that identifies how long various viewers having different characteristics have viewed various digitized videos hosted by the video search system 302 (and stored on the video storage system 304). As with other components and sub-components of the video search system 302, the modeling apparatus 306 can comprise one or more computers in one or more locations, including one or more processors and/or one or more computer-readable storage devices. The modeling apparatus 306 can include a watch-time data repository 308, an instrumentation engine 310, one or more watch-time models 312, one or more creator performance models 314, or a combination of these.

The watch-time repository 308 stores watch-time data, received at the network interface 324, which identifies how long various viewers have viewed videos hosted and presented by the video search system 302. In some implementations, the watch-time repository 308 can include a database that logs watch-time reports provided to the video search system 302 from respective viewers' computing devices. Each time a watch-time report is received from a viewer's computing device, an entry can be added or updated in the database of the watch-time data repository 308. In some implementations, video playback applications on viewer's computing devices can be configured to automatically generate and provide watch-time reports to the video search system 302 as the viewer watches a given video and/or after the viewer has completed watching all or a portion of a given video.

For example, when a viewer begins playing a video, the video playback application can automatically transmit a timestamp indicating a start time of the video to the video search system 302, which is logged in the database. As the viewer continues to watch the video, the video playback application can periodically (e.g., every 1 second or less frequently) ping the video search system 302 to confirm that the user is continuing to play the video. When the viewer stops playing the video, the video playback application can send a message to the video search system 302 that indicates the viewer has stopped the video, and the message can be logged in the database to indicate the total watch time of the video by the viewer in a session. In some implementations, the video playback application may store logs of one or more videos a user viewed and respective watch times of the videos over a period of time (e.g., over a browsing session, an hour, a day, a week, a month, a year, etc.). The stored logs can then be transmitted to the video search system 302 on a regular basis, and the modeling apparatus 306 can register the logged data in the watch-time data repository 308. In some implementations, the watch-time data repository 308 may thus include data that identifies a plurality of different digitized videos, and for each respective video, a respective watch time of the video by each of a plurality of viewers.

In some implementations, the modeling apparatus 306 can include an instrumentation engine 310 (or the instrumentation engine may be a separate component of the video search system 302). The instrumentation engine 310 is generally configured to generate and inject executable code or other instructions into web pages or applications associated with the playback of videos on client devices to cause the client devices to report watch-time data back to the video search system 302. For example, the instrumentation engine 310 may insert a script into a web page that presents a video, and when the script is executed in a web browser at the client computing device, the script monitors the status of the video being played on the client device and logs watch-time data. The script can then asynchronously report watch-time information to the video search system 302.

The modeling apparatus 306 is further operable to generate one or more watch-time models 312 using information from the watch-time data repository 308 and information about the viewers whose watch-time is reflected in the watch-time data repository 308. In some implementations, the modeling apparatus 306 can access or otherwise obtain information about viewers from the viewer profile manager 318. The viewer profile manager 318 is generally operable to assign unique identifiers to viewers and to correlate information about one or more characteristics of viewers with their respective identifiers. In some implementations, the viewer characteristics can generally be classified into one of two categories, namely demographic characteristics and behavioral characteristics. The demographic characteristics may encompass personal characteristics of the viewer (e.g., age group, gender) and/or external characteristics of the viewer (e.g., geographic location where video was watched, time of day video was watched, type of computing device on which the viewer watched the video, video playback application used to watch the video, browser application used to watch the video, viewer's network connection bandwidth).

The behavioral characteristics generally relate to actions the viewer takes in connection with watching a particular video. One example of a behavioral characteristic is a set of one or more queries that the user submitted to the video search system and/or to another computing system (e.g., a general search engine) during a user session that led to the viewer watching a particular video. For example, viewer 1 may have visited the homepage of the video-sharing service provided by the video search system 302 and entered a first query of "football." After seeing a list of video results responsive to the first query, viewer 1 enters a refined query of "hail mary." The video search system 302 returns, to viewer 1's computing device, as video content responsive to the second query, a second list of video search results, from which viewer 1 selects a first video to watch. Tom's computing device can generate a watch-time report that is sent to the video search system 302, including information that identifies the first video, information that identifies viewer 1 (e.g., viewer 1's unique ID), information that identifies how long viewer 1 viewed the first video, and information that identifies the first and second queries. The video search system 302 can then process and store all or some of the information from the report in the watch-time data repository 308, the behavioral data repository 322, or both. As such, the system 302 can correlate the watch time for the first video with a viewer category associated with the first query, the second query, or both (or keywords extracted from the first and/or second queries). Other examples of behavioral characteristics include viewer navigation data, which identifies one or more web pages that the user visited in a session that led the viewer to a given video; view history data, which indicates one or more other videos a user viewed in a session in which the user also viewed a particular video that is the subject of certain watch-time data; click data or conversion data of content items (e.g., ads) that the user selected in connection with viewing a particular video. In some implementations, the viewer profile manager 318 may store data that identifies one or more content targeting parameters that were used to select video content or other content to serve to a viewer. The viewer profile manager 318, the modeling apparatus 318, or both, may correlate specific watch time segments with behavioral characteristics of the viewer that generated the watch time. In some implementations, the data managed by the demographic data repository 320 and the behavioral data repository 322 may be stored in one or more databases on devices in one or more locations.

In some implementations, the viewer profile manager 318 may define a plurality of viewer categories by grouping viewers according to their characteristics, as indicated by the demographic data repository 320 and/or the behavioral data repository 322. In some implementations, each unique viewer is assigned to only one of the plurality of viewer categories (i.e., the respective sets of characteristics of the viewer categories is non-overlapping). As a rudimentary example, four viewer categories may be defined based on respective combinations of the age group characteristic and the gender characteristic, where each characteristic has two possible alternative values. A first group may consist of male viewers aged 25-35, a second group may consist of female viewers aged 25-35, a third group may consist of male users over age 35, and a fourth group may consist of female users over age 35. Of course, as the profile manager 318 defines viewer categories based on increasing numbers of characteristics and/or increasing numbers of possible values for those characteristics, the total number of viewer categories may increase rapidly. For example, by segmenting users into one of 5 age groups (rather than 2), the number of viewer categories may increase from 4 to 10. Generally, the viewer categories may be defined as coarsely or granularly as needed in light of the available viewer data. For example, combinations of tens or hundreds of characteristics may be used to define very granular viewer categories, or combinations of just a few characteristics may be used to define coarser viewer categories.

In some implementations, the viewer profile manager 318 may define a plurality of viewer categories by grouping viewers according to their characteristics, where at least some of the viewer categories partially overlap each other. As such, the profile manager 318 may assign a single viewer to two or more partially overlapping viewer categories as appropriate. For example, a first viewer category may consist of viewers that (1) arrived at a video by submitting a search query having a first keyword and (2) are aged 21-25 years old. A second viewer category may consist of viewers that (1) arrived at a video by submitting a search query having the first keyword and (2) are female. Therefore, viewer 2, a female viewer between 21-25 years old who, in this example, arrived at a video by submitting a search query having the first keyword, fits into both the first and second viewer categories because they are not mutually exclusive categories.

Viewer characteristics and other viewer profile information may be obtained by any of various techniques or combinations of techniques. In some implementations, viewers may maintain accounts with the video search system 302, and users may voluntarily provide demographic information to the video search system 302 as part of their account data. In some implementations, viewer information may be derived from communications received from viewers' computing devices, including requests for video content and watch-time reports sent from viewers' computing devices. For example, location data may be included or derived from messages received from viewer's computing devices, and based on the location data a geographic location can be correlated with a viewer. In some implementations, the video search system 302 may obtain viewer information from external sources other than the viewers' computing devices themselves. For instance, the video search system 302 may obtain social data from social networks or may otherwise determine information about viewers from web pages or other publicly available documents on the Internet.

In situations in which the systems and other techniques discussed here collect personal information about users (e.g., viewers), or may make use of personal information, the users may be provided with an opportunity to control whether programs or features collect user information (e.g., information about a user's watch time, social network, social actions or activities, profession, a user's preferences, a user's search history, a user's navigation history, or a user's current location), or to control whether and/or how to receive content from the video server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the system.

Referring again to the modeling apparatus 306 of the video search system 302, the modeling apparatus 306 may generate, store, and maintain (e.g., update) one or more watch-time models 312 based on video watch-time data, as indicated by the watch-time data repository 308, and based on characteristics of viewers whose activities produced the watch-time data, as indicated by the viewer profile manager 318. Generally, the watch-time models 312 store data that indicate how long various groups of viewers watched individual videos or groups of videos. In some implementations, the modeling apparatus 306 generates the watch-time models 312 by grouping the watch time for respective videos or groups of videos based on characteristics of the viewers of the respective videos or groups of videos. In some implementations, the modeling apparatus 306 identifies appropriate viewer groups from the viewer profile manager 318. Therefore, the viewer groups employed by the modeling apparatus 306 may correspond to the viewer categories defined by the viewer profile manager 318, such that the watch-time models 312 indicate how long various viewers within each of the viewer categories watched individual videos or groups of videos. For example, the watch-time data repository 308 may show that, over a certain period of time (e.g., an hour, a day, a week, or a month) 5,000 unique viewers watched a particular video for an accumulated watch time of 8 hours among all the viewers. The watch-time models 312 may, in turn, specify a distribution of the watch time for the particular video among various viewer categories, as indicated by the viewer profile manager 318. For instance, the watch-time model 312 may indicate that 37 minutes of the 8 hours of total watch time are associated with male viewers located in urban geographic areas, 4.5 hours of the total watch time are associated with female viewers in rural geographic areas, 70 minutes of the total watch time are associated with male viewers in rural geographic areas, and the balance of the 8 hours of watch time is associated with associated with female viewers located in urban geographic areas. The watch-time model 312 thus indicates for the particular video relative interests in the video by different categories of viewers as indicated by the relative watch times of the video by viewers in each category. Similarly, the modeling apparatus 306 may boost the watch time of viewers who have achieved a certain status on the video-sharing service or a related service (e.g., a social network) as a reward to those viewers for achieving the status or because the status signifies a level of trust in the viewers' viewing habits. For example, the watch times of registered members of the video-sharing service may be boosted relative to the watch times of non-registered viewers.

As previously described, the viewer profile manager 318 can in some implementations define partially overlapping viewer categories such that a given viewer can belong to multiple different viewer categories. In such implementations, the modeling apparatus 306 may apportion the viewer's watch time according to among each of the viewer categories to which the viewer belongs according to various criteria. For example, the modeling apparatus 306 may assign 40-percent of a viewer's watch time to a first viewer category to which the user belongs, and can assign the remaining 60-percent of the viewer's watch time to a second viewer category to which the user belongs. In some implementations, the apportionment of a viewer's watch time among each applicable viewer category can be based on scores assigned to the applicable viewer category. The scores may reflect, for example, the relative values of each viewer category to the video search system 302. For example, a given viewer may belong to both first and second viewer categories, to which the modeling apparatus 306 has assigned scores of 5 and 10, respectively. Therefore, according to the viewer category scores, ⅓ of the viewer's watch time may be apportioned to the first viewer category and ⅔ of the viewer's watch time may be apportioned to the second viewer category. In some implementations, the apportionment of a viewer's watch time among each applicable viewer category can be based on other information about the viewer or about the data that was used to classify a user into one or more viewer categories. For example, the viewer profile manager 218 may process data about a viewer and may determine that there is a 75-percent likelihood that the viewer is male and a 25-percent likelihood that the viewer is female. Because the viewer profile manager 218 does not have complete confidence in the viewer's gender classification, 75-percent of the viewer's watch time may be assigned to a viewer category defined at least in part by a male characteristic, and 25-percent of the viewer's watch time may be assigned to a viewer category defined at least in part by a female characteristic.

In some instances, it may be useful to keep track of viewer's watch times with respect to groups of videos rather than or in addition to individual videos. As such, the modeling apparatus 306 may, in some implementations, determine watch-time models 312 that indicate, for each of multiple groups of videos, a distribution of watch times of the video among various viewer categories. For example, the modeling apparatus 306 may analyze data from the watch-time data repository 308 to determine total watch times of videos within respective groups of videos over a period of time by a population of viewers. The modeling apparatus can then group the watch time for each group of video by viewer category to generate watch-time distributions. The modeling apparatus 306 may group videos according to various criteria, as indicated by the video storage system 304. For example, videos may be grouped by creator, by channel, by age (e.g., amount of time since a video was submitted for distribution on the video-sharing service), by genre (e.g., product reviews, music videos, animation, television shows, action, comedy, horror, children's videos), by popularity (e.g., total number of views), or a combination of two or more of these. By determining watch-time distributions for groups of videos, the video selector 316 can, in some implementations, more readily determine video content to serve to a viewer's computing device in response to a request for video content by selecting videos from within one or more groups of videos that have relatively high watch times by viewers that have characteristics that match characteristics of the viewer to whom the selected video content is to be presented.

As the video search system 302 may constantly collect new watch-time data from viewers, the modeling apparatus 312 may be configured to update or regenerate the watch-time models 312 (and the content performance models 314) on a continuous or periodic basis. In some implementations, the models 312, 314 may be maintained based on a rolling window of watch-time data. For example, once each day the modeling apparatus 312 may update the models 312, 314 based on watch time that occurred in the past 7 days. Every day, then, the models 312, 314 can be updated to incorporate watch-time data from a most recent day and to discard watch-time data more than a week old. In some implementations, the modeling apparatus 306 can update the models 312, 314 with a completely fresh set of data (e.g., every week the models may be regenerated using data from only the most recent week). In some implementations, the modeling apparatus 312, 314 may update the models from time to time to incorporate a most recently collected set of watch-time data without discarding older watch-time data.

The watch-time models 312 may organize the groupings of video watch-time information in various ways. In some implementations, each respective video or group of videos can be correlated with a plurality of values that respectively indicate the total (accumulated) watch time of the respective video or group of videos by viewers in a respective one of a plurality of viewer categories. In some implementations, the watch-time models 312 may indicate the converse. Namely, for each of a plurality of viewer categories, watch times of viewers within the respective viewer category may be distributed among a set of videos or groups of videos.

In some implementations, the watch-time models 312 can indicate, for each video or group of videos served by the video search system 302 over a period of time, a distribution of watch times for the respective video or group of videos among each of a plurality of viewer categories. If no viewers have viewed a given video within a particular category during that period of time, the watch time assigned to that category may be null (zero). In some implementations, the watch-time models 312 may identify actual watch time totals for each viewer category (e.g., viewers in a first category watched the video for a total of 132 minutes, while viewers in a second category watched the video for a total of 61 minutes). In some implementations, the watch-time models 312 may identify relative watch time totals for each viewer category (e.g., 68-percent of the watch time for the video was by viewers in the first category, while 32-percent of the watch time for the video was by viewers in the second category). In some implementations, the video search system 302 may value certain viewers' watch time more than others, and therefore the modeling apparatus 306 may weigh the watch time of individual viewers or groups of viewers when determining the watch-time distributions for the watch-time models 312. For example, a celebrity or an expert in a field that is the subject of a video or group of videos may have their actual watch times tripled for the video or group of videos, or other users' watch times may be devalued.

In some implementations, the modeling apparatus 306 can use video watch-time data to determine one or more creator performance models 314. Generally, the creator performance models 314 identify creator performance scores (i.e., scores for parties that have submitted videos to the video-sharing service for distribution). The creator performance scores can be determined by the modeling apparatus 306 based on how long various categories of viewers have viewed the creators' videos. In this way, the video search system 302 can leverage watch-time information as a metric for assessing the performance of creators on the video-sharing service. Moreover, and as further described with respect to the video content selector 316, the creator performance scores can be used in some implementations as a heuristic for ranking and determining video content to serve to viewers. In some implementations, the video search system 302 may also determine how to allocate assets to creators based at least in part on the performance scores.

In some implementations, the modeling apparatus 306 may determine creator performance scores as follows. First, the modeling apparatus 306 accesses from the watch-time data repository 308 information about how long viewers have watched various videos over a period of time. The modeling apparatus 306 then identifies from the viewer profile manager 318 a set of one or more viewer categories that will form the basis of the creator performance scores. In some implementations, the identified set of viewer categories may be a complete set of viewer categories that encompasses all viewers, or the identified set of viewer categories may comprise less than all of the viewer categories in the complete set. For example, if the complete set of viewer categories included (1) males over 45, (2) males 35-45, (3) females over 45, and (4) females 35-45, then the modeling apparatus 306 could determine the creator performance scores based on the watch times of viewers within all four categories (the complete set), or based on the watch times of viewers within fewer than all four categories.

The modeling apparatus 306 then generates groups of watch time for each of the identified viewer categories by assigning respective pieces of watch time to appropriate ones of the viewer categories based on the characteristics of the viewers whose views resulted in the respective watch times. For example, the watch times of one or more videos by one or more viewers who belong to a first viewer category may be assigned to a watch time group for the first viewer category, the watch times of one or more videos by one or more viewers who belong to a second viewer category may be assigned to a watch time group for the second viewer category, and so on. Based on the groupings, the modeling apparatus 306 then accumulates the watch times in each viewer category to determine a total watch time that indicates, for each viewer category, a total amount of time that viewers within the category spent watching videos over a defined time interval (e.g., a day, a week, a month). The modeling apparatus 306 also breaks down the total watch time in each viewer category by creator. That is, in each viewer category, the modeling apparatus 306 identifies all the creators of the videos watched by viewers within the category, and determines for each of the identified creators how much of the total watch time for the category was watch time of videos of the respective creator. As an example, the modeling apparatus 306 may determine that, over the course of a month, viewers aged 45-55 watched a total of 2,000 hours of video, while viewers aged 56-65 watched a total of 4,000 hours of video over that month. Moreover, the total watch time of multiple videos distributed by a first creator on the video-sharing service over that month by viewers aged 45-55 may be determined as 130 hours. The total watch time of the multiple videos distributed by the first creator on the video-sharing service over that month by viewers aged 56-65 may be determined as 25 hours. Thus, the first creator's videos can be seen to contribute to a greater share of the total watch time for the 45-55 category than the 56-65 category.

Further in the process of determining creator performance scores, the modeling apparatus 306 can identify scores for each of the viewer categories that indicate how much weight the modeling apparatus 306 will afford watch time from each of the viewer categories in determining creator performance scores. Watch time from different viewer categories may be weighted differently from each other, for example, to reward creators whose videos generate more watch time from viewer categories that the video-sharing service deems more valuable than from viewer categories that the video-sharing service deems less valuable. Thus, if the video-sharing service targets video content to particular demographics of viewers, creators can receive more credit for watch time generated by viewers within the targeted demographics than for watch time by viewers in other demographics. In some implementations, the modeling apparatus 306 may determine the viewer category scores based on how much revenue viewers within the respective viewer categories generated for the video-sharing service over a period of time by playing videos distributed through the video-sharing service during that period of time. For example, the video search system 302 may serve video content for presentation to viewers along with additional sponsored content that third parties pay the video-sharing service to present. The video-sharing service can therefore generate revenue from serving sponsored content, and revenue can be attributed to individual instances of video content served to viewers and to collections of video content served to respective categories of users. In some implementations, the modeling apparatus 306 can assign scores to the various viewer categories that correspond to the revenue generated from serving sponsored content to viewers in the various viewer categories.

Using the viewer category scores and the watch times associated with the various viewer categories, the modeling apparatus 306 can compute the creator performance scores. In some implementations, the creator performance score for a given creator can be computed by (1) determining, for each respective viewer category, the product of the (i) share of the total watch time for the respective viewer category that is attributable to videos associated with the given creator and (ii) the viewer category score for the respective viewer category, and (2) taking the sum of the products across all the viewer categories. For example, consider a scenario in which viewers in a first category watched 100 minutes of videos over a period of time and viewers in a second category watched 200 minutes of videos over the same period of time. The share of the watch time attributable to videos of a particular creator by viewers in the first category is 20 minutes and the share of the watch time attributable to videos of the same creator by viewers in the second category is also 20 minutes. The viewer category score for the first video is 50 and the viewer category score for the second video is 250. The creator performance score for the particular creator can be calculated as (20/100)*(50)+(20/200)*(250)=35. In some implementations, the video-sharing service can use the creator performance scores as a model or heuristic for distributing assets (e.g., points, incentives, membership status, access to creative tools, or revenue) to the creators.

The video content selector 316 is operable to select video content to serve to various computing devices in response to requests for video content. Generally, the video content selector 316 can select video content to serve based on watch-time information, as indicated by the watch-time models 312, based on creator performance scores, as indicated by the creator performance models 314, or both. In response to a request from a particular viewer, the video content selector 316 may select video content for one or more videos to serve to the particular viewer's computing device based on identifying that historically the one or more videos, or other videos that are similar to the one or more videos, were watched for relatively long times by various viewers having characteristics that match or are similar to characteristics of the viewer for whom the video content is targeted. For example, the video content selector 316 may identify, from the request manager 326, that a user who submitted a request for video content is a middle-aged male from Albuquerque, New Mexico. The video content selector 316 can then query the watch-time models 312 to identify videos that the watch-time data indicates were preferred (e.g., watched for longer times) by other users that match the same profile of the requesting user. Generally, videos having higher watch times by matching or similar viewers are more likely to be selected in response to a request than are videos having lower watch times by matching or similar viewers. Continuing the preceding example, the video content selector 316 may rank a plurality of videos that are determined to be relevant to the request from the middle-aged male from Albuquerque. The videos may be ranked based on multiple heuristics, including how closely the subject matter of candidate videos matches one or more topics of the request, watch-time heuristics, and/or creator performance heuristics. With respect to the watch-time heuristics, candidate videos can be promoted in the ranking the longer that the videos were watched by middle-aged men from Albuquerque or by viewers in similar demographics. With respect to the creator performance heuristics, candidate videos by creators having higher performance scores may be promoted in the ranking. The video selector 316 can then select video content for one or more of the top-ranked candidate videos to serve to the requesting user's computing device. In some implementations, the served content may be the digital videos themselves. In some implementations, the served content may not include the digital videos themselves, but may include references to the digital videos (e.g., search results that include a title, description, and/or representative image of the selected videos).

In some implementations, the video selector 316 may apply back-off techniques to identify viewer characteristics (and hence viewer categories) that are similar to characteristics of a user that has requested video content. For example, rather than limiting the analysis of watch time by middle-aged male viewers in Albuquerque, New Mexico, the video selector 316 may query the watch-time models 312 to identify watch times of videos by middle-aged male viewers in the entire southwest United States. By expanding the relevant geographic area (e.g., by backing-off), more data points can be analyzed to determine more reliable results.

Figure 4:
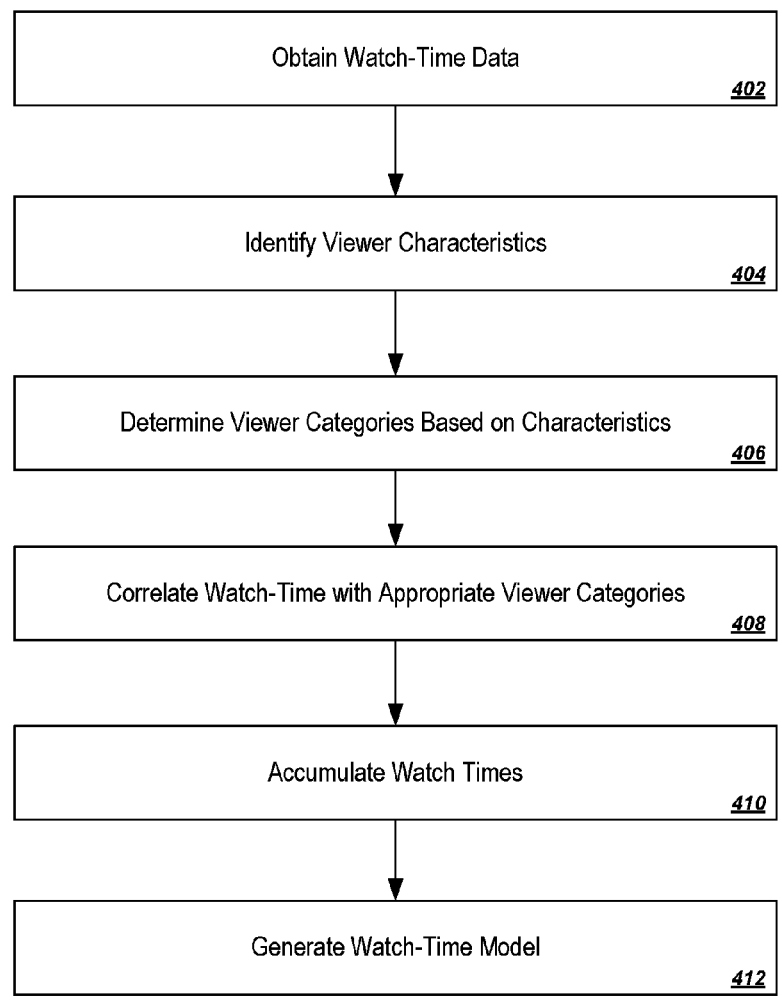
FIG. 4 depicts a flowchart of an example process for generating a watch-time model that a video search system uses to affect the selection of video content to serve to a user based on historical information about how long various groups of viewers have watched different videos.

Turning to FIG. 4, a flowchart is shown of an example process 400 for generating a watch-time model that a video search system can use to affect the selection of video content to serve to a user based on historical information about how long various groups of viewers have watched different videos. The watch-time model that results from the process 400 is generally equivalent to the watch-time models 312 that has been described with respect to FIG. 3. In some implementations, the process 400 may be carried out by the systems and devices discussed throughout this document, including by the watch-time modeling apparatus 306 of FIG. 3.

The process can begin at stage 402, when a computing system obtains a set of watch-time data. The watch-time data can indicate, for each of various videos, how long various viewers have watched the video at their respective computing devices. For example, data representing that a viewer has watched a ten-minute video for only five seconds may strongly suggests that the viewer was not interested in that video. A viewer that watched substantially the entire video, however, is much more likely to have been interested in the video. Watch-time thus serves as a proxy for inferring viewers' levels of interest in videos. The watch-time data can be reported by the individual viewers' computing devices to a central computing system that generates the watch-time model, in some instances. In some implementations, the computing system may generate the watch-time model using data about the actual lengths of time viewers watched various videos. However, to the extent the actual watch times may unduly favor longer videos over shorter videos, the computing system can, in some implementations, normalize the watch-time data so that it represents the portions of the overall video length that viewers watched (e.g., viewer 1 watched 30-percent of video 1, viewer 2 watched 78-percent of video 1).

At stage 404, the computing system identifies characteristics of the viewers whose video views are represented in the watch-time data. The characteristics may include demographic characteristics of the viewers, behavioral characteristics of the viewers, other characteristics of the viewers, or a combination of these. At stage 406, the computing system groups viewers into a collection of different viewer categories. Each viewer category can include viewers that share a same set of characteristics with each other. For example, all viewers that arrived at their respective videos using the same or similar search queries may be grouped together, or all viewers having the same or similar navigation histories within a same geographic area may be grouped into a viewer category. In some implementations, the system may group viewers at very granular levels such that all viewers in the groups share the same set of multiple characteristics. The system may then cluster some of the granular groups together by merging groups whose viewers meet a threshold level of similarity (e.g., viewers having similar characteristics or groups having similar watch-time distributions). At stage 408, the system correlates watch-time information with appropriate viewer categories. For example, watch time for videos watched by viewers within a first viewer category can be grouped together, watch time for videos watched by viewers within a second category can be grouped together, and so on. At stage 410, the computing system determines distributions of watch time for videos by viewers within each of the viewer categories, and at stage 412, information about these distributions is stored in a watch-time model.

Figure 5:
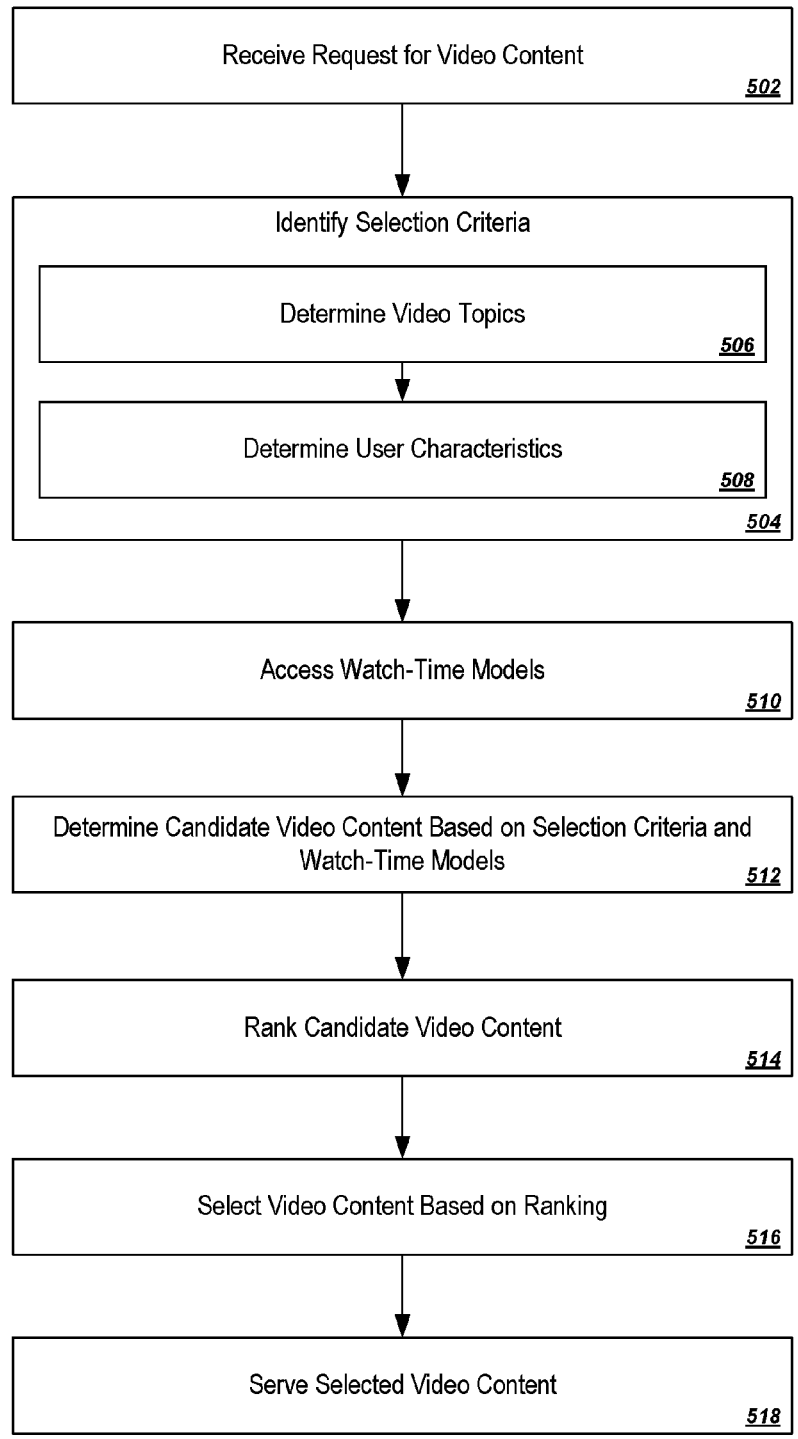
FIG. 5 is a flowchart of an example process for selecting video content to serve to a computing device of a viewer using information about how long other viewers, who are similar to the first viewer, have watched various videos during a past period of time.

FIG. 5 is a flowchart of an example process 500 for selecting video content to serve to a computing device of a targeted user using information about how long users similar to the targeted user have watched various videos during a past period of time. In some implementations, the process 500 may be carried out by the computing systems and devices discussed throughout this document, including by the video search system 302 discussed with respect to FIG. 3.

At stage 502, the video search system receives a request to serve video content to a user. The request may have originated from the user as a request to search for specific video content, or the request may have been generated to provide unsolicited video recommendations to the user, for example. At stage 504, the search system identifies selection criteria associated with the request. The selection criteria may be expressly specified in the request (e.g., keywords in a search query), or may be derived from the request based on information contained in the request (e.g., characteristics of a user identified in the request). In some implementations, the system can identify selection criteria that includes both video topics (stage 506) and user characteristics (stage 508). At stage 510, the video system accesses one or more watch-time models, such as those described with respect to FIGS. 3 and 4. The watch-time models may, for example, indicate distributions of watch time of various videos by different categories of viewers. At stage 512, the system can determine content for a set of candidate videos to serve to the user in response to the received request. The candidate videos may be selected based on the selection criteria (e.g., videos that match topics specified in a query) and based on the watch-time distributions indicated by the watch-time models. At stage 514, the search system ranks the candidate videos according to one or more heuristics to determine an ordered list of videos that are determined to be most relevant to the user. In some implementations, the system may rank the videos based at least in part on how long all or some of the candidate videos have been watched by users whose characteristics match or are similar to the characteristics of the targeted user. For example, videos that have been watched for longer times (or for which a greater proportion of the video was watched) by matching or similar users may be promoted in the ranking as compared to videos with lower watch times. At stage 516, the system selects video content for one or more top-ranked videos to serve to the user, and at stage 518 the system serves the selected video content.

Figure 6:
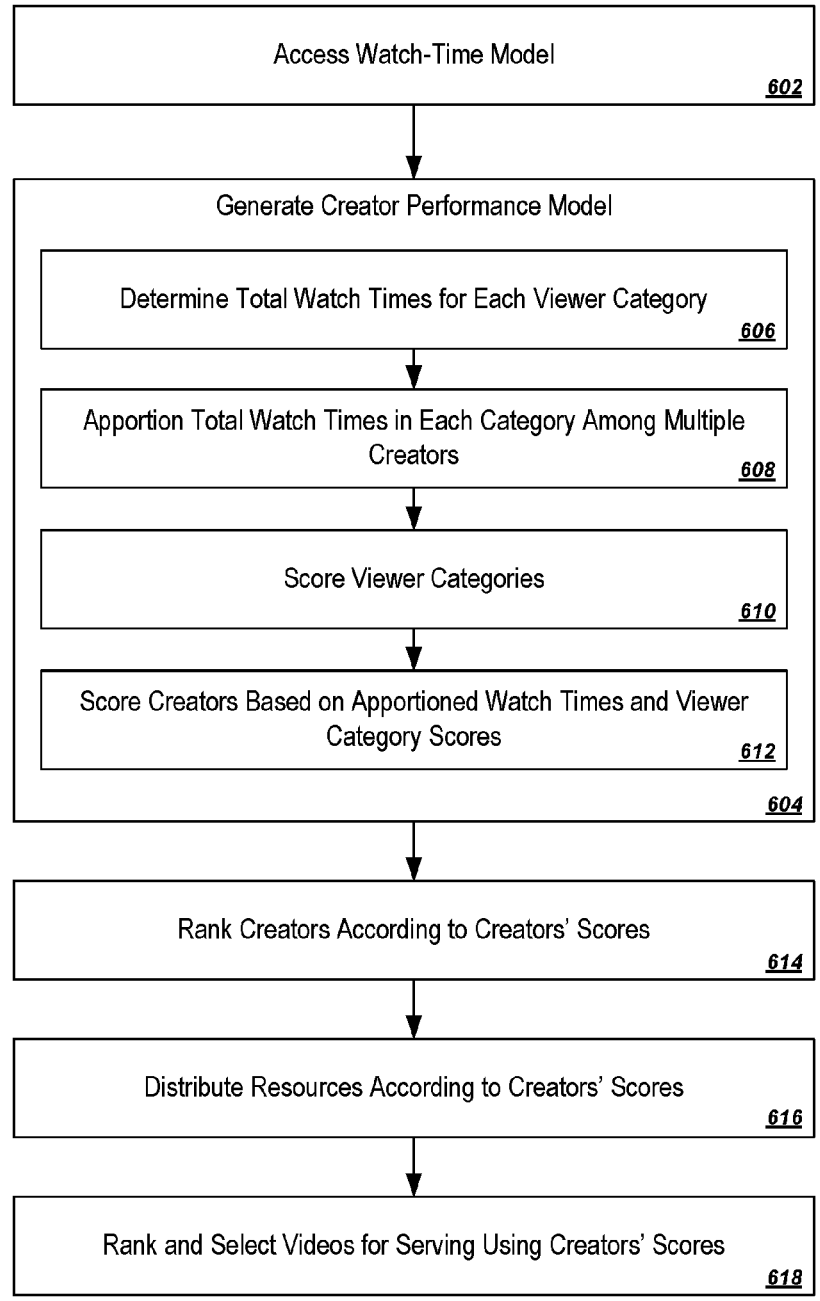
FIG. 6 is a flowchart of an example process for determining and using creator performance scores to rank video content and to allocate assets distributed to creators for improving the quality of videos submitted to a video-sharing service.

FIG. 6 shows a flowchart of an example process 600 for determining and using creator performance scores to rank video content and to allocate assets distributed to creators for improving the quality of videos submitted to a video-sharing service. In some implementations, the process 600 may be carried out by the systems and devices discussed herein, including by the video search system 302 of FIG. 3.

At stage 602, a computing system accesses watch-time models that indicate distributions of watch times of various videos by viewers in different viewer categories. In some implementations, the data indicated by the watch-time models may be used to determine the creator performance scores. Additionally or alternatively, the creator performance scores may be determined in part based on raw watch-time data before the data is processed for use in the watch-time models.

At stage 604, the computing system uses the watch-time data to determine a creator performance model. The creator performance model indicates scores for creators that reflect the relative performance of their videos with respect to various viewer categories, based at least in part on how long viewers in the various categories have viewed the creators' respective videos. Watch time from viewers in some categories may be more valuable than watch time from viewers in other categories, and so the creator performance model can take into account different weights that apply to the various viewer categories when computing the creator performance model. In some implementations, operations for determining the creator performance model are represented by stages 606-612. At stage 606, the system determines the total watch times of videos by viewers in each respective viewer category. At stage 608, the system determines, for each viewer category, respective shares of the total watch time for the viewer category that are attributable to videos of various creators. At stage 610, the system determines scores for the various user categories, where the scores can be used to weight the contribution of watch time from each viewer category to the creators' performance scores. In some implementations, the viewer category scores can be based on an amount of revenue that was generated by serving videos to the viewers in the respective viewer categories. At stage 612, the system determines creator performance scores for each of the creators based on the shares of watch times attributed to the various creators in each viewer category, and based on the viewer category scores.

Once the creator performance model has been determined, the system uses the model, and the scores indicated by the model, to rank creators with respect to each other (stage 614). The system may then distribute assets to creators according to the creator performance scores and/or the ranking (stage 616). The system may also use the creator performance scores and/or the ranking as a heuristic for selecting content for quality videos to serve to computing devices in response to requests (stage 618).

Figure 7:
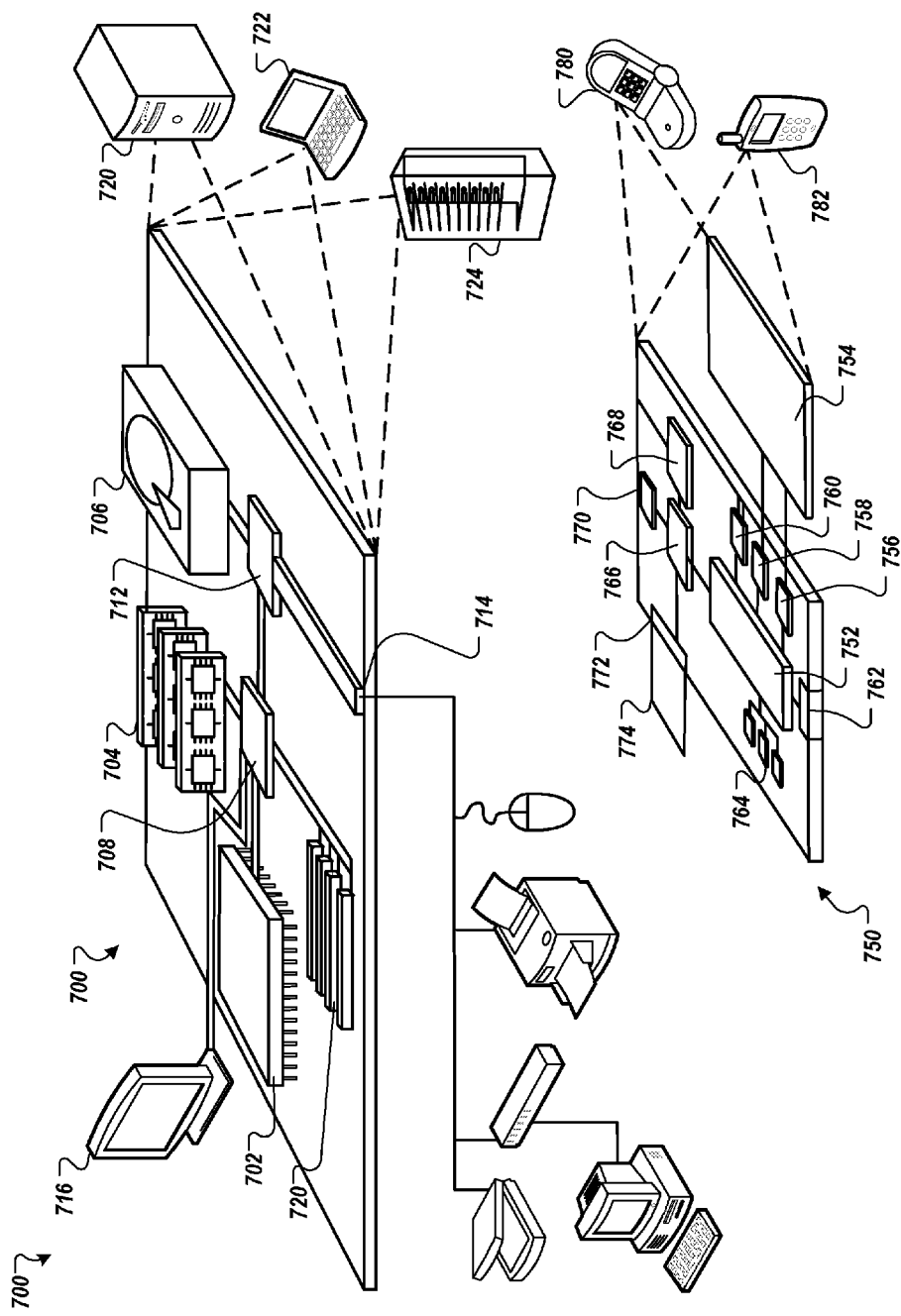
FIG. 7 shows an example of a computing device and a mobile computing device that may be used to implement the computer-implemented methods and other techniques described herein.

FIG. 7 shows an example of a computing device 700 and a mobile computing device that may be used to implement the computer-implemented methods and other techniques described herein. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, BLUETOOTH, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device

750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a BLUETOOTH, WiFi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In situations in which the systems, methods, devices, and other techniques here collect personal information (e.g., context data) about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although various implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computing system for serving videos over a network, the computing system comprising:
a modeling apparatus that (i) obtains, for various digitized videos that the computing system has presented at client devices over a network, watch time information that specifies an amount of time that the various digitized videos were presented at the client devices, (ii) groups the watch time information into different groups based on characteristics of users associated with the client devices, and (iii) determines, based on the grouping of watch time information and for each particular group of users of a plurality of groups of users, an accumulated watch time that indicates how long the various digitized videos were presented to users within the particular group of users;
a front-end server that receives a request for video content and serves video content identified in response to the request over the network to a computing device that is separate from the computing system for presentation at the computing device;
a request manager, including one or more processors, that analyzes the request for video content and identifies selection criteria in the request, including identifying one or more characteristics of a user that submitted the request for video content;
one or more video file storage devices that store a plurality of digitized videos that have been made available by various parties for distribution over the network; and
a video selector, including one or more processors, that selects, from the video file storage devices, video content of a particular digitized video among the plurality of digitized videos to serve to the computing device in response to the request, wherein the selection is based at least in part on a first accumulated watch time that indicates how long the particular digitized video has been presented at client devices associated with users having characteristics that match the one or more characteristics of the user that submitted the request for video content, as indicated by the modeling apparatus.

2. The computing system of claim 1, wherein the modeling apparatus:
groups the watch time information into different groups by assigning respective portions of the watch time information to different viewer categories that correspond to different sets of characteristics of the users associated with the client devices at which the various digitized videos were presented; and
identifies, for each respective viewer category, a distribution of watch time of users in the respective viewer category among digitized videos in a group of digitized videos that were at least partially presented at computing devices associated with users in the respective category.

3. The computing system of claim 1, wherein, for each respective digitized video among the plurality of digitized videos stored on the one or more video file storage devices, the modeling apparatus:
identifies, from the watch time information and for each respective viewer category among a plurality of viewer categories, how long the respective digitized video was presented at client devices associated with users in the respective viewer category; and
assigns to the respective digitized video, for each respective viewer category among the plurality of viewer categories and based on how long the respective digitized video was presented at client devices associated with users in the respective viewer category, a score that indicates a relevance of the respective digitized video to the respective viewer category.

4. The computing system of claim 1, wherein the one or more characteristics of the user that submitted the request for video content comprise at least one of demographic characteristics of the user or behavioral characteristics of the user.

5. The computing system of claim 4, wherein the one or more characteristics of the user that submitted the request for video content comprise demographic characteristics that indicate at least an age or gender of the user.

6. The computing system of claim 4, wherein:
the one or more characteristics of the user that submitted the request for video content comprise behavioral characteristics that indicate one or more queries submitted by the user in a same session in which the user submitted the request for video content; and
the video selector selects to serve the video content of the particular digitized video among the plurality of digitized videos based at least on how long the particular digitized video was presented at client devices associated with other users during sessions in which the other users also submitted the one or more queries or at least one query determined to be similar to the one or more queries.

7. The computing system of claim 4, wherein:
the one or more characteristics of the user that submitted the request for video content comprise behavioral characteristics that indicate a navigation history of the user associated with the request for video content; and
the video selector selects to serve the video content of the particular digitized video among the plurality of digitized videos based at least on how long the particular digitized video was presented at client devices associated with other users having a same or similar navigation history as the user that submitted the request, in browsing sessions that led the other users to watch the particular digitized video.

8. The computing system of claim 1, wherein the video selector is further configured to select video content to serve to various computing devices as recommendations to respective users of the various computing devices.

9. The computing system of claim 1, wherein:
in response to receiving the request for video content, the request manager is configured to identify one or more topics of the requested video content, including identifying the topics from at least one of a user-entered query that is a part of the request or identifying the topics from information associated with the user that is not included in the request; and
the video selector is configured to select video content to serve to the computing device by:
identifying digitized videos that are determined to be relevant to the one or more topics;
ranking the identified digitized videos based at least on how long each of the identified digitized videos has been presented at client devices associated with users having characteristics that match the one or more characteristics of the user that submitted the request for video content; and based on the ranking, selecting video content of one or more top-ranked digitized videos to serve to the computing device, including the video content of the particular digitized video.

10. The computing system of claim 1, further comprising an instrumentation manager, including one or more processors, that generates and embeds computer code in various web pages that the computing system serves to various client devices for the presentation of various digitized videos, wherein the computer code is configured, when executed on the various client devices, to cause the various computing devices to periodically report over the network and to the computing system amounts of time that the various digitized videos were presented at the various client devices.

11. The computing system of claim 1, wherein:
the front-end server is configured to serve the video content of the particular digitized video by streaming the video content to the computing device, and
the computing device is configured to (i) receive the stream of the video content of the particular digitized video from the computing system and (ii) play the stream of the video content.

12. A computer-implemented method, comprising:
obtaining, at a computing system, data that indicates, for each respective computing device among a plurality of computing devices to which at least a portion of a first video hosted by the computing system was served, a respective watch time for the first video that occurred at the respective computing device;
for each of the respective watch times for the first video, attributing the respective watch time to one or more viewer categories among a plurality of viewer categories based on one or more characteristics of a user of the respective computing device at which the respective watch time occurred;
for each respective viewer category among the plurality of viewer categories, accumulating the respective watch times that have been attributed to the respective viewer category to generate an accumulated watch time for the respective viewer category, wherein the accumulated watch time for the respective viewer category indicates how long the first video was presented to users within the respective viewer category;
determining whether to provide video content of the first video to a first user using a criterion that is based at least on the accumulated watch time for the first video for a particular viewer category among the plurality of viewer categories that matches the first user; and
in response to the computing system determining that the criterion for providing the video content of the first video to the first user is satisfied, serving, to a first computing device of the first user, the video content of the first video for presentation at the first computing device.

13. The computer-implemented method of claim 12, wherein determining whether to provide video content of the first video to the first user comprises determining whether the accumulated watch time of the first video for the particular viewer category that matches the first user meets a threshold watch time.

14. The computer-implemented method of claim 12, wherein determining whether to provide video content of the first video to the first user comprises:
ranking a plurality of candidate videos, including the first video, based at least on respective accumulated watch times of the plurality of candidate videos for the particular viewer category that matches the first user; and
selecting video content for one or more videos of the plurality of candidate videos based on the ranking.

15. The computer-implemented method of claim 12, wherein the plurality of viewer categories classify viewers based on at least one of demographic characteristics of viewers and online behavioral characteristics of viewers.

16. The computer-implemented method of claim 12, further comprising:
for each respective viewer category among the plurality of viewer categories, assigning a respective quality score to the respective viewer category;
identifying a first watch time of the first video by a user in a first viewer category among the plurality of viewer categories;
in response to identifying the first watch time, increasing a performance score of a creator of the first video by an amount that is based on the first watch time and the respective quality score assigned to the first viewer category;
identifying a second watch time of the first video by a user in a second viewer category among the plurality of viewer categories; and
in response to identifying the second watch time, increasing the performance score of the creator of the first video by an amount that is based on the second watch time and the respective quality score assigned to the second viewer category.

17. The computer-implemented method of claim 16, comprising determining the respective quality scores assigned to respective viewer categories based on revenue generated as a result of viewers in the respective viewer categories watching videos hosted by the computing system.

18. The computer-implemented method of claim 12, wherein, for each respective viewer category among the plurality of viewer categories, the accumulated watch time for the respective viewer category indicates a sum total of watch times of the first video by users within the respective viewer category.

19. The computer-implemented method of claim 12, wherein:
serving the video content of the first video for presentation at the first computing device comprises streaming the video content of the first video to the first computing device, and
the first computing device is configured to (i) receive the stream of the video content of the first video from the computing system and (ii) play the stream of the video content of the first video.

20. One or more non-transitory computer-readable media having instructions stored thereon that, when executed by one or more processors, cause performance of operations comprising:
obtaining, at a computing system, data that indicates, for each respective computing device among a plurality of computing devices to which at least a portion of a first video hosted by the computing system was served, a respective watch time for the first video that occurred at the respective computing device;
for each of the respective watch times for the first video, attributing the respective watch time to one or more viewer categories among a plurality of viewer categories based on one or more characteristics of a user of the respective computing device at which the respective watch time occurred;

for each respective viewer category among the plurality of viewer categories, accumulating the respective watch times that have been attributed to the respective viewer category to generate an accumulated watch time for the respective viewer category, wherein the accumulated watch time for the respective viewer category indicates how long the first video was presented to users within the respective viewer category;

determining whether to provide video content of the first video to a first user using a criterion that is based at least on the accumulated watch time for the first video for a particular viewer category among the plurality of viewer categories that matches the first users; and in response to the computing system determining that the criterion for providing the video content of the first video to the first user is satisfied, serving, to a first computing device of the first user, the video content of the first video for presentation at the first computing device.

21. The one or more non-transitory computer-readable media of claim 20, wherein determining whether to provide video content of the first video to the first user comprises determining whether the accumulated watch time of the first video for the particular viewer category that matches the first user meets a threshold watch time.

22. The one or more non-transitory computer-readable media of claim 20, wherein determining whether to provide video content of the first video to the first user comprises:

ranking a plurality of candidate videos, including the first video, based at least on respective accumulated watch times of the plurality of candidate videos for the particular viewer category that matches the first user; and selecting video content for one or more videos of the plurality of candidate videos based on the ranking.

23. The one or more non-transitory computer-readable media of claim 20, wherein:

serving the video content of the first video for presentation at the first computing device comprises streaming the video content of the first video to the first computing device, and the first computing device is configured to (i) receive the stream of the video content of the first video from the computing system and (ii) play the stream of the video content of the first video.

\* \* \* \* \*